(12) United States Patent
Patel et al.

(10) Patent No.: US 11,631,233 B2
(45) Date of Patent: Apr. 18, 2023

(54) METHOD AND SYSTEM FOR DOCUMENT CLASSIFICATION AND TEXT INFORMATION EXTRACTION

(71) Applicant: Tata Consultancy Services Limited, Mumbai (IN)

(72) Inventors: Devang Jagdishchandra Patel, Mumbai (IN); Prosenjit Mondal, Kolkata (IN); Rajdeep Chatterjee, Mumbai (IN); Prabhat Ranjan Mishra, Mumbai (IN); Pushp Kumar Jain, Pune (IN); Harinakshi Raina, Mumbai (IN); Amit Kumar Agrawal, Kolkata (IN); Anshika Jain, Mumbai (IN); Ankita Gupta, Mumbai (IN); Ketkee Pandit, Mumbai (IN)

(73) Assignee: TATA CONSULTANCY SERVICES LIMITED, Mumbai (IN)

(*) Notice: Subject to any disclaimer, the term of this patent is extended or adjusted under 35 U.S.C. 154(b) by 92 days.

(21) Appl. No.: 17/206,321

(22) Filed: Mar. 19, 2021

(65) Prior Publication Data

US 2022/0180113 A1     Jun. 9, 2022

(30) Foreign Application Priority Data

Dec. 9, 2020   (IN) .............................. 202021053633

(51) Int. Cl.
*G06V 10/00* (2022.01)
*G06V 10/22* (2022.01)
(Continued)

(52) U.S. Cl.
CPC ........ *G06V 10/225* (2022.01); *G06F 18/2148* (2023.01); *G06F 18/23213* (2023.01);
(Continued)

(58) Field of Classification Search
CPC ...... G06V 10/225; G06V 10/28; G06V 10/56; G06V 30/413; G06V 30/10;
(Continued)

(56) References Cited

U.S. PATENT DOCUMENTS

| 2004/0042659 | A1* | 3/2004 | Guo ..................... G06V 30/413 |
| | | | 382/176 |
| 2016/0028921 | A1* | 1/2016 | Thrasher .................. H04N 1/60 |
| | | | 358/519 |
| 2019/0019020 | A1* | 1/2019 | Flament ................. G06V 30/40 |

OTHER PUBLICATIONS

Vilas, Pere, "Classification of identity documents using a deep convolutional neural network", Classification of identity documents using a deep convolutional neural network, 2018, Open Access, http://openaccess.uoc.edu/webapps/o2/bitstream/10609/73186/7/pvilasTFM0118memoria.pdf.

* cited by examiner

*Primary Examiner* — Claire X Wang
*Assistant Examiner* — Denise G Alfonso
(74) *Attorney, Agent, or Firm* — Finnegan, Henderson, Farabow, Garrett & Dunner, LLP

(57) ABSTRACT

Variation in received documents types and templates used for each document type poses challenge in developing a generic background noise removal approach for automatic text information extraction technique. Embodiments herein provide a method and a system for document classification and text information extraction. Time efficient and accurate text detection engine-based Region of Interest (ROI) technique is provided to accurately identify text region followed by a multi-layered neural network based architecture for enhanced classification accuracy to identify the type of document. A multistage image pre-processing approach is provided for efficient, effective, and accurate background noise removal from the classified document, which includes unsupervised clustering, identification, segmentation, mask- (Continued)

ing, contour approximation, selective subtraction, and dynamic thresholding. Further, text information extraction is applied on the pre-processed image to determine co-relation between text information blocks and associate values with the labels for attributes to be extracted to extract final text.

9 Claims, 17 Drawing Sheets

(51) Int. Cl.
*G06V 30/413* (2022.01)
*G06V 10/56* (2022.01)
*G06V 10/28* (2022.01)
*G06F 18/214* (2023.01)
*G06F 18/23213* (2023.01)
*G06V 30/10* (2022.01)

(52) U.S. Cl.
CPC .............. *G06V 10/28* (2022.01); *G06V 10/56* (2022.01); *G06V 30/413* (2022.01); *G06V 30/10* (2022.01)

(58) Field of Classification Search
CPC ............. G06V 30/19173; G06V 10/25; G06V 30/412; G06K 9/6223; G06K 9/6257
See application file for complete search history.

Output image set from text detection –

$T = \{t_1, t_2, ..., t_n\}$

Where, $t$ = region of detected text within input image, $t = \{x_{min}, y_{min}, x_{max}, y_{max}\}$, $x_{min}$ = minimum x coordinate for 't', $y_{min}$ = minimum y coordinate for 't', $x_{max}$ = maximum x coordinate for 't', $y_{max}$ = maximum y coordinate for 't', For ex- $t1 = \{x_{1min}, x_{1max}, y_{1min}, y_{1max}\}$

FIG. 3C $$POI(x_{min}) = Min(x_{1min}, x_{2min}, \ldots x_{nmin}) \text{ of } T,$$

$$POI(x_{max}) = Max(x_{1max}, x_{2max}, \ldots x_{nmax}) \text{ of } T,$$

$$POI(y_{min}) = Min(y_{1min}, y_{2min}, \ldots y_{nmin}) \text{ of } T,$$

$$POI(y_{max}) = Max(y_{1max}, y_{2max}, \ldots y_{nmax}) \text{ of } T$$

POI Region of Interest = { $POI(x_{min})$, $POI(x_{max})$, $POI(y_{min})$, $POI(y_{max})$ }

METHOD AND SYSTEM FOR DOCUMENT CLASSIFICATION AND TEXT INFORMATION EXTRACTION

PRIORITY CLAIM

This U.S. patent application claims priority under 35 U.S.C. § 119 to Indian filed patent application No. 202021053633 filed on 9 Dec. 2020. The entire contents of the aforementioned application are incorporated herein by reference.

TECHNICAL FIELD

The embodiments herein generally relate to text information extraction and, more particularly, to a method and system for document classification and text information extraction.

BACKGROUND

Efficient and accurate extraction of relevant text information is key factor for effectiveness of automatic text information extraction systems. Many organizations in domains such as but not limited to Banking, Finance, Insurance, Educational institutions and the like receive large volume of scanned images of documents, such as Identity Documents (IDs) and variety of forms. Quality of the scanned images varies due to factors such as illumination effect, scanning quality etc. Further, text information of interest in theses scanned images is overlaid with noise elements such as color and texture patterns, background colors and images/logos, water marks, maps, illumination etc. In practical scenarios, a user is provided with options to upload ID document or Proof of Identity (POI) document in different formats, which he/she may upload for verification and various service requests from an organization. There is no uniformity in the scanned images received as each user may upload a different type of POI. Further each region, country may have a different templates for the type of ID. Similar is the case where text information is to be extracted from scanned images of other documents such as report cards, club membership cards, marksheets, financial documents, forms and so on, wherein there may or may not be uniformity in the templates of each received scanned image.

Conventional template based matching has technical challenges in such scenarios as they need to be equipped with knowledge base of known templates. This conventional approach also mandates prior classification of documents as it is required to prior know the template to be applied. While processing, extracted document contents are compared with existing templates and text zones are compared with matched template to identify label and respective information. Further, higher the accuracy of background noise removal technique more accurate is the text extraction result. Some of the existing works attempt to address the document type variation and template variation problem but effectiveness of these approaches is majorly dependent on pre-processing of the scanned images to remove background noise. Considering the variation in received documents types with equal variation in templates for each document type, developing a generic background removal approach providing accurate background removal that addresses variation in document type, template or illumination conditions, watermarks, presence of photographs of the scanned image is a challenge. Furthermore, the text information of interest in the scanned image may not be present across entire scanned image. Thus, required are time efficient and highly accurate Region of Interest (ROI) detection techniques to rightly focus on text information of interest, which are critical to enhance the overall effectiveness of text extraction information systems.

SUMMARY

Embodiments of the present disclosure present technological improvements as solutions to one or more of the above-mentioned technical problems recognized by the inventors in conventional systems. For example, in one embodiment, a method for document classification and text information extraction is provided.

The method receives a scanned image of a document and detects a Region of Interest (ROI) in the scanned image by marking a ROI bounding box on the scanned image using a text detection engine based-ROI technique that locates corner coordinates of a ROI bounding box defining the ROI.

Further, the method classifies the ROI into a document type among a plurality of document types using a trainable Deep Learning based multi-layered Neural Network (NN) classification model.

Further, the method applies multistage pre-processing on the classified ROI to remove background noise. The multistage pre-processing comprises: a) reading the ROI into a Red Green Blue (RGB) color space and flattening the ROI; b) performing unsupervised clustering by applying K-means clustering on a plurality of pixels of the ROI in the RGB color space to generate a plurality of color clusters; c) obtaining a plurality of centroids, of each of the plurality of color clusters, wherein each centroid represents a unique color associated with each of the plurality of clusters; d) converting the centroids from RGB color space to Hue Saturation Value (HSV) space; e) generating a plurality of color masks corresponding to the plurality of clusters, wherein each color mask is generated based on a) the unique color associated with a centroid among the plurality of centroids and b) range of HSV color space defined around the centroid; f) applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique color of the centroid; g) identifying in each of the plurality of binary ROI images, one or more contours of interest from among the plurality of contours, wherein the one or more contours of interest are a) closed contours and b) have size above a predefined contour size; h) performing a subtraction, of the one or more of contours of interest identified for each of the plurality of binary ROI images, from the ROI in accordance to spatial positions of pixels of the one or more contours of interest identified for each of the plurality of binary ROI images, wherein the subtraction eliminates the background noise while retaining information of interest to generate a first level pre-processed image; and i) applying thresholding on the first level pre-processed image to obtain a second level pre-processed image using a threshold value derived dynamically from a histogram of the first level pre-processed image.

Furthermore, the method applies a text detection technique on the second level pre-processed image to mark a plurality of bounding boxes around text information in the second level pre-processed image, wherein each of the plurality of bounding boxes are identified by spatial positions defined by corner coordinates and corresponding height and width, and wherein one or more bounding boxes are clubbed based on a spatial proximity criteria.

Thereafter the method extracts text information from each of the plurality of bounding boxes by applying OCR.

Furthermore, the method determines contextual relationship among the extracted text information and refining the extracted text information based on configuration rules for the document type.

In another aspect, a system for document classification and text information extraction is provided. The system comprises a memory storing instructions; one or more Input/Output (I/O) interfaces; and one or more hardware processors coupled to the memory via the one or more I/O interfaces, wherein the one or more hardware processors are configured by the instructions to receive a scanned image of a document and detects a Region of Interest (ROI) in the scanned image by marking a ROI bounding box on the scanned image using a text detection engine based-ROI technique that locates corner coordinates of a ROI bounding box defining the ROI.

Further, the system classifies the ROI into a document type among a plurality of document types using a trainable Deep Learning based multi-layered Neural Network (NN) classification model.

Further, the system applies multistage pre-processing on the classified ROI to remove background noise. The multistage pre-processing comprises: a) reading the ROI into a Red Green Blue (RGB) color space and flattening the ROI; b) performing unsupervised clustering by applying K-means clustering on a plurality of pixels of the ROI in the RGB color space to generate a plurality of color clusters; c) obtaining a plurality of centroids, of each of the plurality of color clusters, wherein each centroid represents a unique color associated with each of the plurality of clusters; d) converting the centroids from RGB color space to Hue Saturation Value (HSV) space; e) generating a plurality of color masks corresponding to the plurality of clusters, wherein each color mask is generated based on a) the unique color associated with a centroid among the plurality of centroids and b) range of HSV color space defined around the centroid; f) applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique color of the centroid; g) identifying in each of the plurality of binary ROI images, one or more contours of interest from among the plurality of contours, wherein the one or more contours of interest are a) closed contours and b) have size above a predefined contour size; h) performing a subtraction, of the one or more of contours of interest identified for each of the plurality of binary ROI images, from the ROI in accordance to spatial positions of pixels of the one or more contours of interest identified for each of the plurality of binary ROI images, wherein the subtraction eliminates the background noise while retaining information of interest to generate a first level pre-processed image; and i) applying thresholding on the first level pre-processed image to obtain a second level pre-processed image using a threshold value derived dynamically from a histogram of the first level pre-processed image.

Furthermore, the system applies a text detection technique on the second level pre-processed image to mark a plurality of bounding boxes around text information in the second level pre-processed image, wherein each of the plurality of bounding boxes are identified by spatial positions defined by corner coordinates and corresponding height and width, and wherein one or more bounding boxes are clubbed based on a spatial proximity criteria.

Thereafter the system extracts text information from each of the plurality of bounding boxes by applying OCR.

Furthermore, the system determines contextual relationship among the extracted text information and refining the extracted text information based on configuration rules for the document type.

In yet another aspect, there are provided one or more non-transitory machine-readable information storage mediums comprising one or more instructions, which when executed by one or more hardware processors causes a method for document classification and text information extraction.

The method receives a scanned image of a document and detects a Region of Interest (ROI) in the scanned image by marking a ROI bounding box on the scanned image using a text detection engine based-ROI technique that locates corner coordinates of a ROI bounding box defining the ROI.

Further, the method classifies the ROI into a document type among a plurality of document types using a trainable Deep Learning based multi-layered Neural Network (NN) classification model.

Further, the method applies multistage pre-processing on the classified ROI to remove background noise. The multistage pre-processing comprises: a) reading the ROI into a Red Green Blue (RGB) color space and flattening the ROI; b) performing unsupervised clustering by applying K-means clustering on a plurality of pixels of the ROI in the RGB color space to generate a plurality of color clusters; c) obtaining a plurality of centroids, of each of the plurality of color clusters, wherein each centroid represents a unique color associated with each of the plurality of clusters; d) converting the centroids from RGB color space to Hue Saturation Value (HSV) space; e) generating a plurality of color masks corresponding to the plurality of clusters, wherein each color mask is generated based on a) the unique color associated with a centroid among the plurality of centroids and b) range of HSV color space defined around the centroid; f) applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique color of the centroid; g) identifying in each of the plurality of binary ROI images, one or more contours of interest from among the plurality of contours, wherein the one or more contours of interest are a) closed contours and b) have size above a predefined contour size; h) performing a subtraction, of the one or more of contours of interest identified for each of the plurality of binary ROI images, from the ROI in accordance to spatial positions of pixels of the one or more contours of interest identified for each of the plurality of binary ROI images, wherein the subtraction eliminates the background noise while retaining information of interest to generate a first level pre-processed image; and i) applying thresholding on the first level pre-processed image to obtain a second level pre-processed image using a threshold value derived dynamically from a histogram of the first level pre-processed image.

Furthermore, the method applies a text detection technique on the second level pre-processed image to mark a plurality of bounding boxes around text information in the second level pre-processed image, wherein each of the plurality of bounding boxes are identified by spatial positions defined by corner coordinates and corresponding height and width, and wherein one or more bounding boxes are clubbed based on a spatial proximity criteria.

Thereafter the method extracts text information from each of the plurality of bounding boxes by applying OCR.

Furthermore, the method determines contextual relationship among the extracted text information and refining the extracted text information based on configuration rules for the document type.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3A through 3M is a use case example depicting document classification and text information extraction using the system of FIG. 1, in accordance with some embodiments of the present disclosure.

Figure 1:
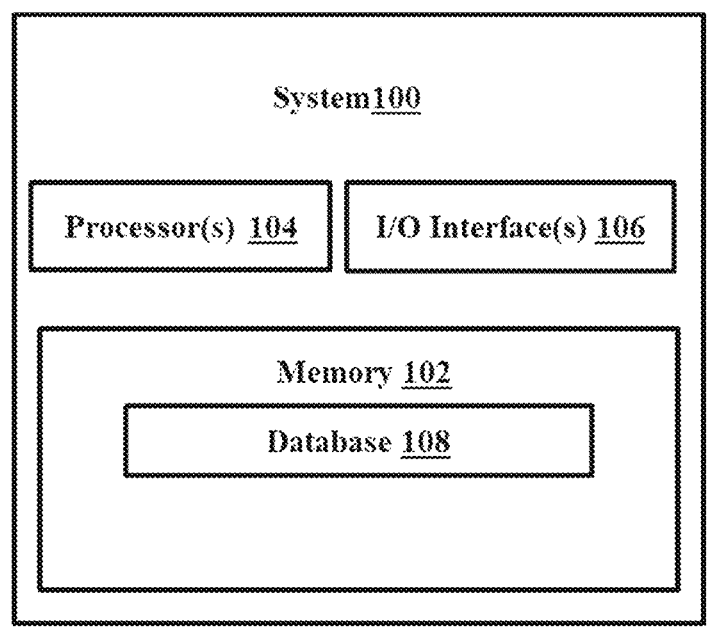
FIG. 1 is a functional block diagram of a system for document classification and text information extraction, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Variation in type or class of documents received as scanned/uploaded images along with equal variation in templates for each document type poses challenge in developing a generic background noise removal approach for automatic text information extraction technique.

Embodiments herein provide a method and a system for document classification and text information extraction by providing a generic background noise removal technique. Method comprises first detecting an Region of Interest in a received scanned image, wherein a computation efficient and accurate text detection engine-based Region of Interest (ROI) technique is provided to accurately identify text region, followed by a multi-layered neural network based architecture for accurate classification of the document type or class. A multistage image pre-processing approach is provided for efficient, effective and accurate background noise removal from the classified document, which includes unsupervised clustering, identification, segmentation, masking, contour approximation, selective subtraction and dynamic thresholding. Further, text information extraction is applied on the pre-processed image to determine co-relation between text information blocks and associate values with the labels for attributes to be extracted, to extract final text.

The term 'document' used herein refers to any documents having text information overlaid on background noise elements such as color marks and texture patterns, background images, logos, maps, watermarks etc. Some examples of these documents are proof of identity (POI) documents like passports, national identification cards, driver license etc.; other documents having background noise such as club membership cards, student mark sheets, financial statements etc.

Method disclosed herein provides a generic text information extraction solution that is document type or template agnostic and utilizes multistage pre-processing to eliminate background noise' the multistage pre-processing further includes performing dynamic thresholding prior to processing the image using OCR for text extraction. The threshold value is derived from a histogram generated for the current scanned image under consideration. Thus, the thresholding approach utilized is specific to the image being processed resulting in image specific threshold value, effectively enhancing the thresholding effect providing more clarity and visibility of text content in the scanned image. The enhanced text visibility improves text presence detection for marking text bounding boxes and further improves accuracy in text extraction using OCR.

Referring now to the drawings, and more particularly to FIGS. 1 through 4, where similar reference characters denote corresponding features consistently throughout the figures, there are shown preferred embodiments and these embodiments are described in the context of the following exemplary system and/or method.

FIG. 1 is a functional block diagram of a system 100 for document classification and text information extraction, in accordance with some embodiments of the present disclosure.

In an embodiment, the system 100, includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface and the like and can facilitate multiple communications within a wide variety of networks N/W and protocol types, including wired networks, for example, LAN, cable, etc., and wireless networks, such as WLAN, cellular, or satellite to receive scanned images and communicate with external devices for sharing the results, or additional processing support on the cloud servers. The memory 102 further includes a Deep Learning based multi-layered Neural Network (NN) classification model (not shown), which is executed via the one or more hardware processors to classify the received scanned images of a document into a class (document type)_among a plurality of predefined classes (document types). The memory 102 also includes configuration rules, text engine and other modules for executing the steps of the method. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 may include the database 108 comprising the received scanned images, pre-processed images at first and second level of pre-processing, extracted text and so on. Thus, the memory 102 may comprise information pertaining to input(s)/output(s) of each step performed by the processor(s) 104 of the device 100 and methods of the present disclosure. In an embodiment, the database 108 may be external (not shown) to the system 100 and coupled to the system via the I/O interface 106. Functions of the components of the system 100 are explained in conjunction with flow diagram depicted in FIGS. 2A through 2C, the use case examples depicted in FIGS. 3A through 3M and context based correlation of extracted text explained in conjunction with FIG. 4.

Figure 2A:
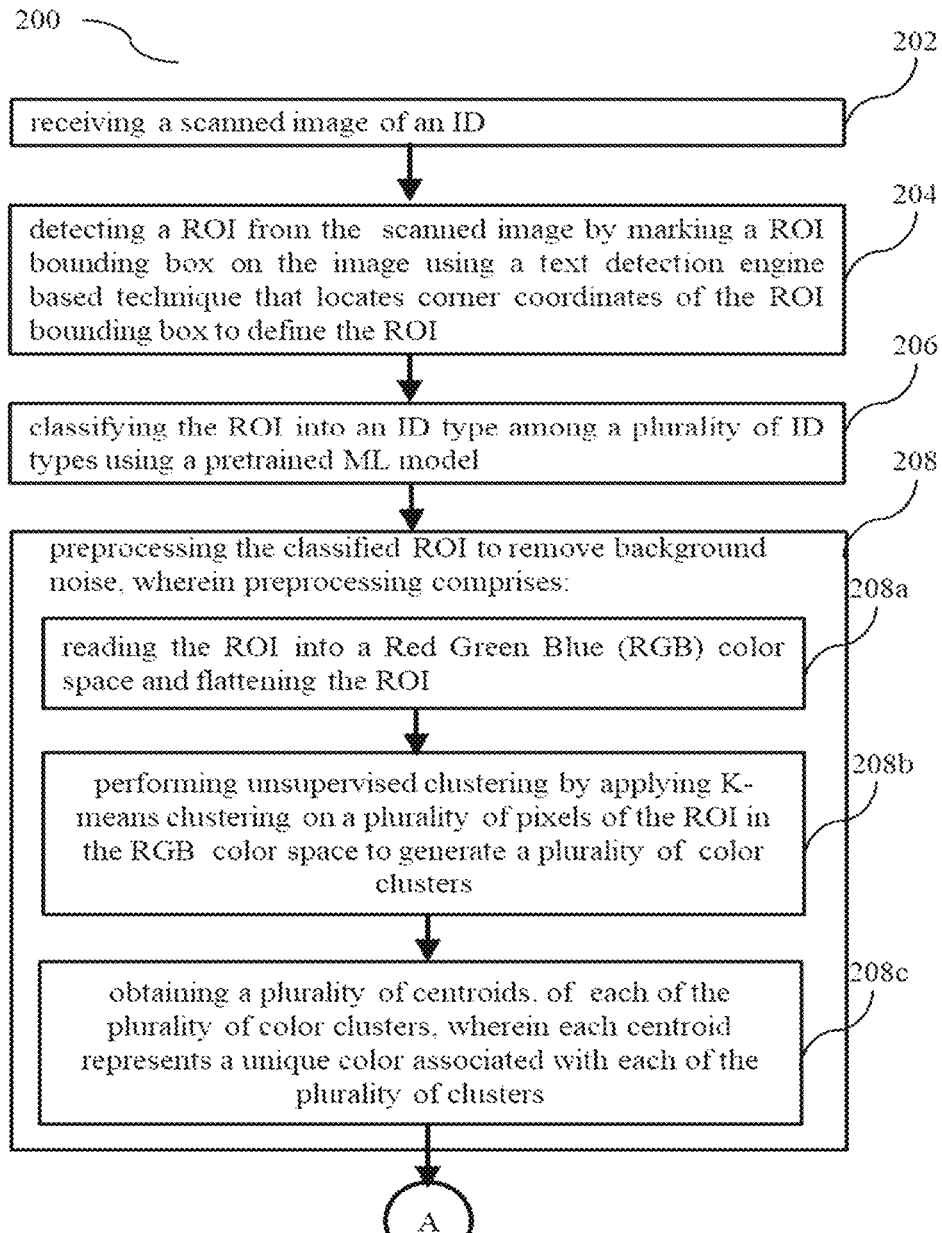
FIGS. 2A through 2C depict a flow diagram illustrating a method for document classification and text information extraction, using the system of FIG. 1, in accordance with some embodiments of the present disclosure.
Figure 2B:
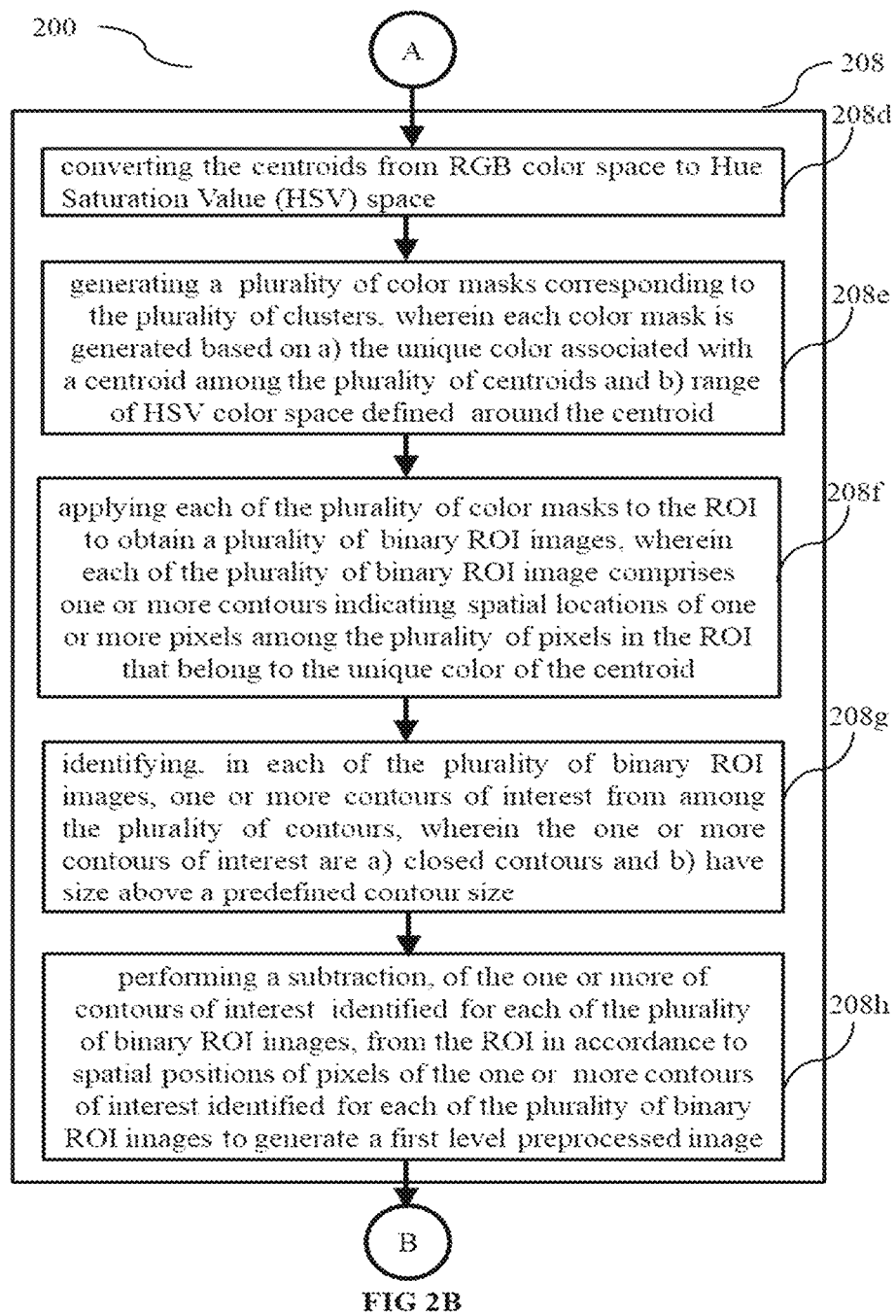
Figure 2C:
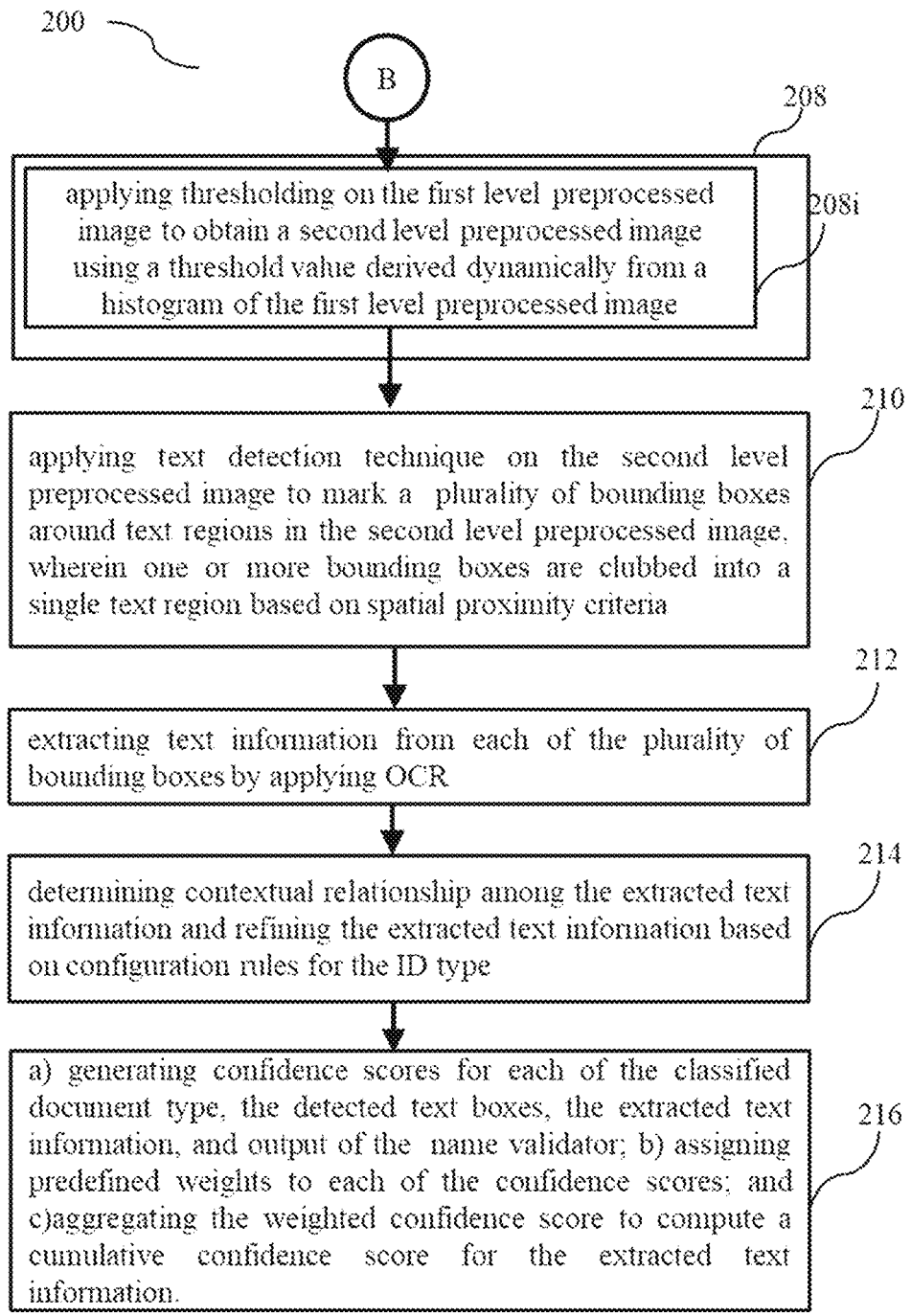

FIG. 2 is a flow diagrams illustrating a method 200 for document classification and text information extraction, using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIG. 1 and the steps of flow diagram as depicted in FIGS. 2A through 2C. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Figure 3A:

The method 200 is explained in conjunction with FIG. 3A through 3M which is a use case example depicting document classification and text information extraction using the system of FIG. 1, in accordance with some embodiments of the present disclosure. FIG. 3A depicts a sample driving license used to explain the method disclosed.

Referring to the steps of the method 200, at step 202, the one or more hardware processors 104 are configured to receive a scanned image of a document as input, as depicted in FIG. 3A. The scanned image as can be seen in FIG. 3A may be a Proof of Identity (POI) document such as a driving license, wherein the image of document of interest is captured as a foreground object placed on a background. It is necessary to rightly focus on region of the image that maps to the actual document and eliminate the irrelevant background.

Figure 3B:
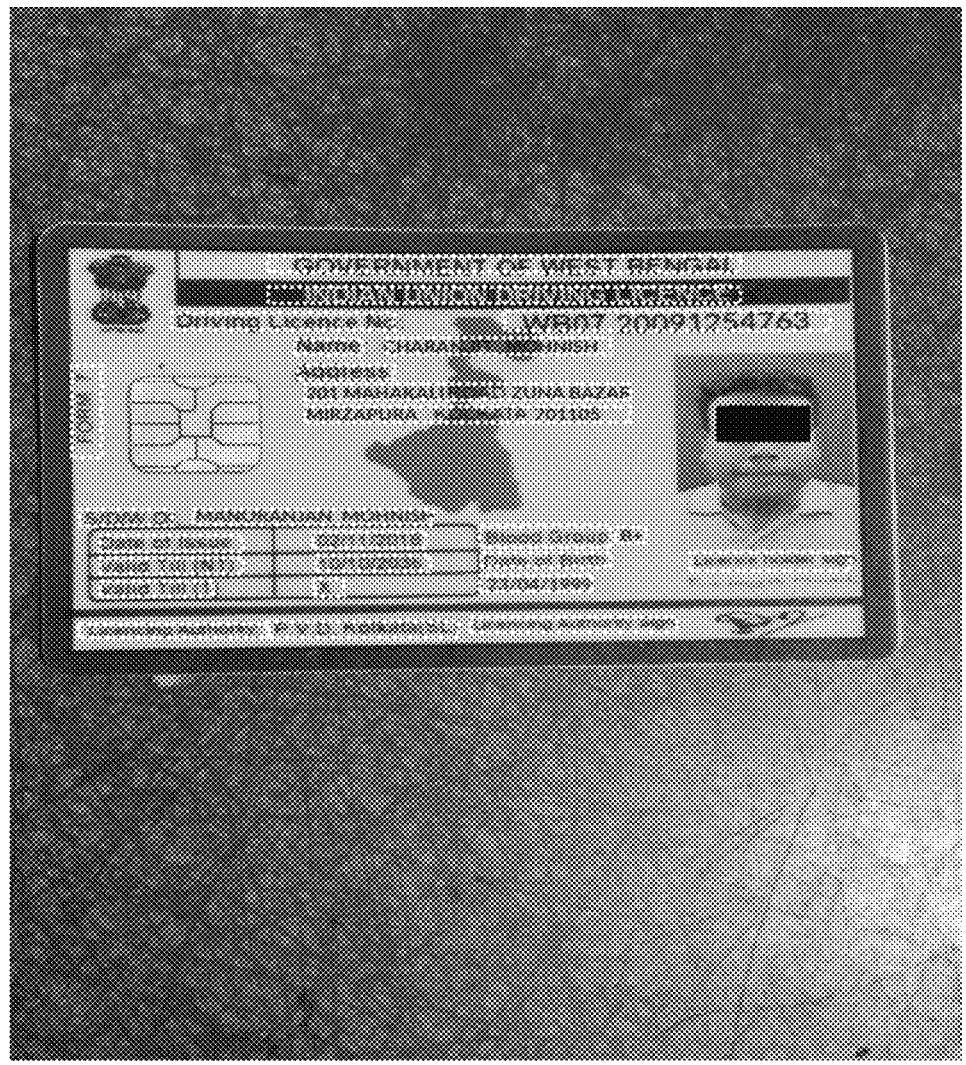
Figures 3D, 3E:
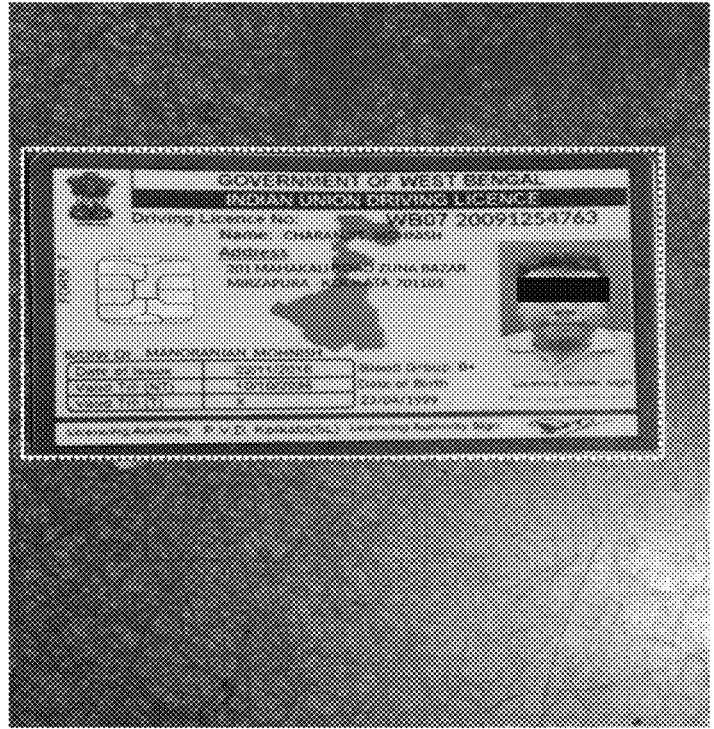
Figure 3F:
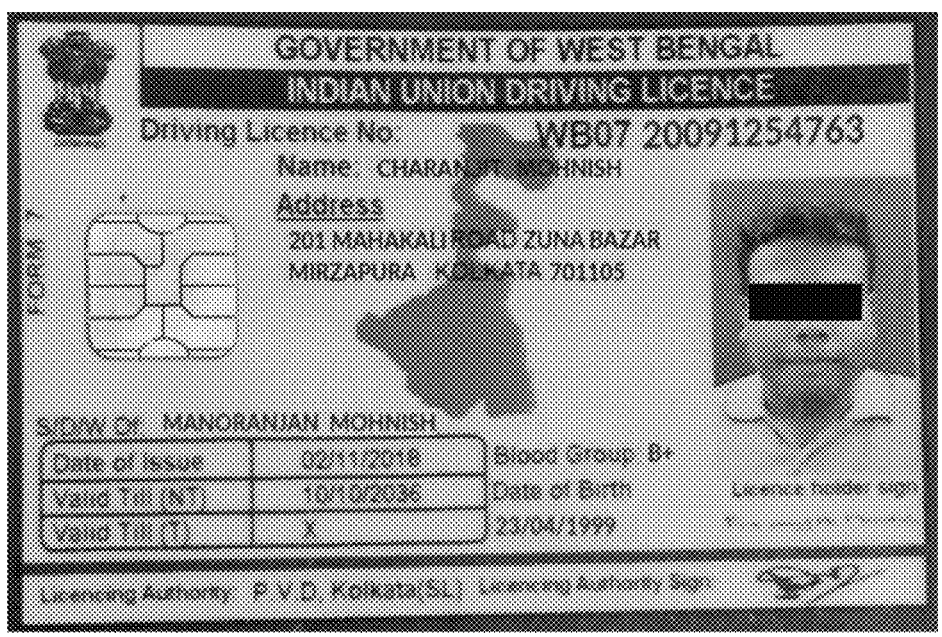

At step 204 the one or more hardware processors 104 are configured to detect a Region of Interest (ROI) in the scanned image by marking a ROI bounding box on the scanned image using a text detection engine based-ROI technique that locates corner coordinates of a ROI bounding box defining the ROI. The ROI detection is explained in conjunction with FIG. 3B to 3F. As understood, the input scanned images may have varying background with variation in color, texture, illumination and is not fixed across scanned images received. Thus, conventional computer vision techniques face challenges is accurate ROI detection. The steps for text engine based-ROI detection disclosed by the method include:

a) Detect the text in the input image by using a text detector engine as depicted in FIG. 3B and marking text regions in the scanned image, identified by corner coordinates of rectangular bounding boxes t1 to tn, as depicted in FIG. 3C.

b) Determine a rectangular bounding box as depicted in FIG. 3D enclosing all the text regions t1 to tn and generate an output image set for the entire text regions spread across the scanned image, as depicted in FIG. 3E. Determine the corner coordinates as depicted.

c) Crop the scanned image in accordance with the rectangular bounding box of FIG. 3D defined by corner coordinates as depicted in FIG. 3E.

Once the ROI is rightly identified at step 204, then at step 206 of the method 200, the one or more hardware processors 104 are configured to classify the ROI into a document type among a plurality of document types using the Deep Learning based multi-layered Neural Network (NN) classification model. The document types can include a passport, a driving license, a unique identification Document (UID), a membership cards and the like. The architecture of the multi-layered Neural Network (NN) classification model used for document classification is provided in table 1 below. The model is trainable, and the training steps include:

a) Generate sample images as training data.

b) Perform data pre-processing, data augmentation and data annotation to train the multi-layered NN based classification model such as CNN model. However, the method disclosed provides configurable model architecture, wherein complexity of the model architecture can be increased or decreases based on training data.

TABLE 1

| Layer (type) | Output Shape | Param # |
| --- | --- | --- |
| conv2d_1 (Conv2D) | (None, 125, 125, 64) | 1792 |
| conv2d_2 (Conv2D) | (None, 125, 125, 64) | 36928 |

TABLE 1-continued

| Layer (type) | Output Shape | Param # |
| --- | --- | --- |
| max_pooling2d_1 (MaxPooling2 | (None, 62, 62, 64) | 0 |
| dropout_1 (Dropout) | (None, 62, 62, 64) | 0 |
| batch_normalization_1 (Batch | (None, 62, 62, 64) | 256 |
| conv2d_3 (Conv2D) | (None, 62, 62, 128) | 73856 |
| max_pooling2d_2 (MaxPooling2 | (None, 31, 31, 128) | 0 |
| dropout_2 (Dropout) | (None, 31, 31, 128) | 0 |
| batch_normalization_2 (Batch | (None, 31, 31, 128) | 512 |
| conv2d_4 (Conv2D) | (None, 31, 31, 128) | 147584 |
| max_pooling2d_3 (MaxPooling2 | (None, 15, 15, 128) | 0 |
| dropout_3 (Dropout) | (None, 15, 15, 128) | 0 |
| flatten_1 (Flatten) | (None, 28800) | 0 |
| dense_1 (Dense) | (None, 256) | 7373056 |
| dropout_4 (Dropout) | (None, 256) | 0 |
| dense_2 (Dense) | (None, 3) | 771 |

Total params: 7,634,755
Trainable params: 7,634,371
Non-trainable params: 384

Figure 3G:
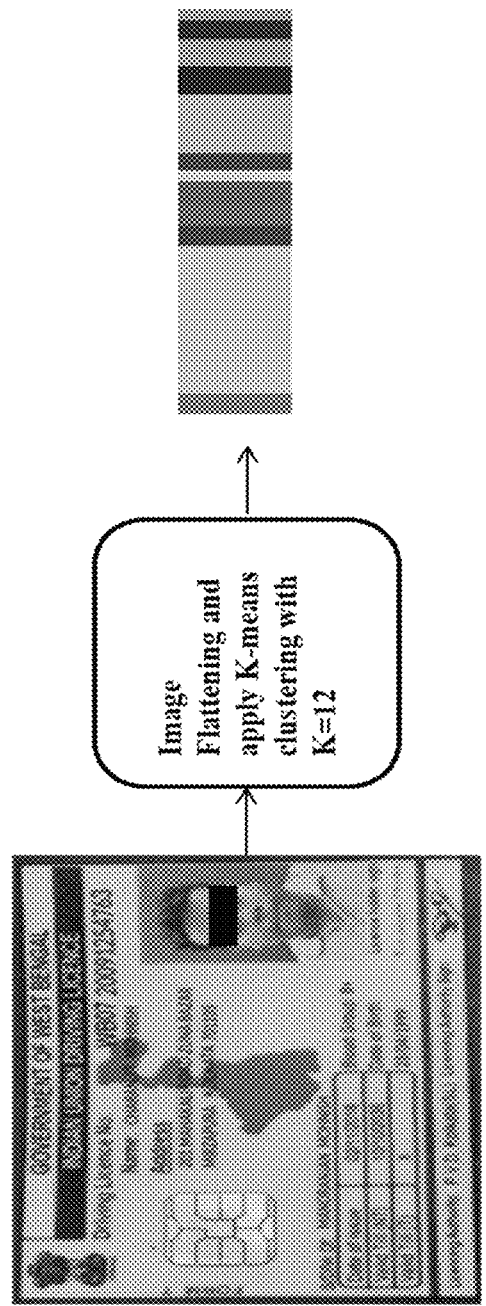

Upon classification and cropping of the scanned document in accordance with he detected ROI, at step 208 the one or more hardware processors 104 are configured to apply multistage pre-processing on the classified ROI to remove background noise. The multistage pre-processing is explained in conjunction with FIGS. 3G through 3K. The multistage pre-processing comprises:

a) Read (208*a*) the ROI into a Red Green Blue (RGB) color space and flattening the ROI (as depicted in FIG. 3G), wherein the 2D image channels are converted to vector space.

b) Perform (208*b*) unsupervised clustering by applying K-means clustering on a plurality of pixels of the ROI in the RGB color space to generate a plurality of color clusters (as depicted in FIG. 3G). This step enables to identify number of significant color present in the ROI and number of pixels or pixel density per identified color clusters. Thus, each cluster represents a color range with pixels, whose RGB values closely match with other pixels of the same cluster. Number of clusters are preset to 12, hence value of K=12. This value of K is determined heuristically. The logic behind deriving the value of K is explained below.

In HSV color space, H value ranges from 0-179, i.e. total 180 discrete values. Within this range each of the three primary colors are represented by 60 discrete values. There are two reasons for selecting K=12.

1) Using K=12, we are detecting 12 different color clusters. So, for each primary color 4 variants of that color are used in an image for all the colors, which is a worst case scenario. If image has fewer colors, then we can identify more variants of the same color.

2) The second reason is to use fewer colors because it is required to identify color patches which consist of pixels which are similar in color, but not necessarily with exact same intensity value. If larger value of K is used, then the clustering will be more fine grained and there exists possibility of detecting multiple patches instead of single patch because of minor color variations.

Figure 3H:
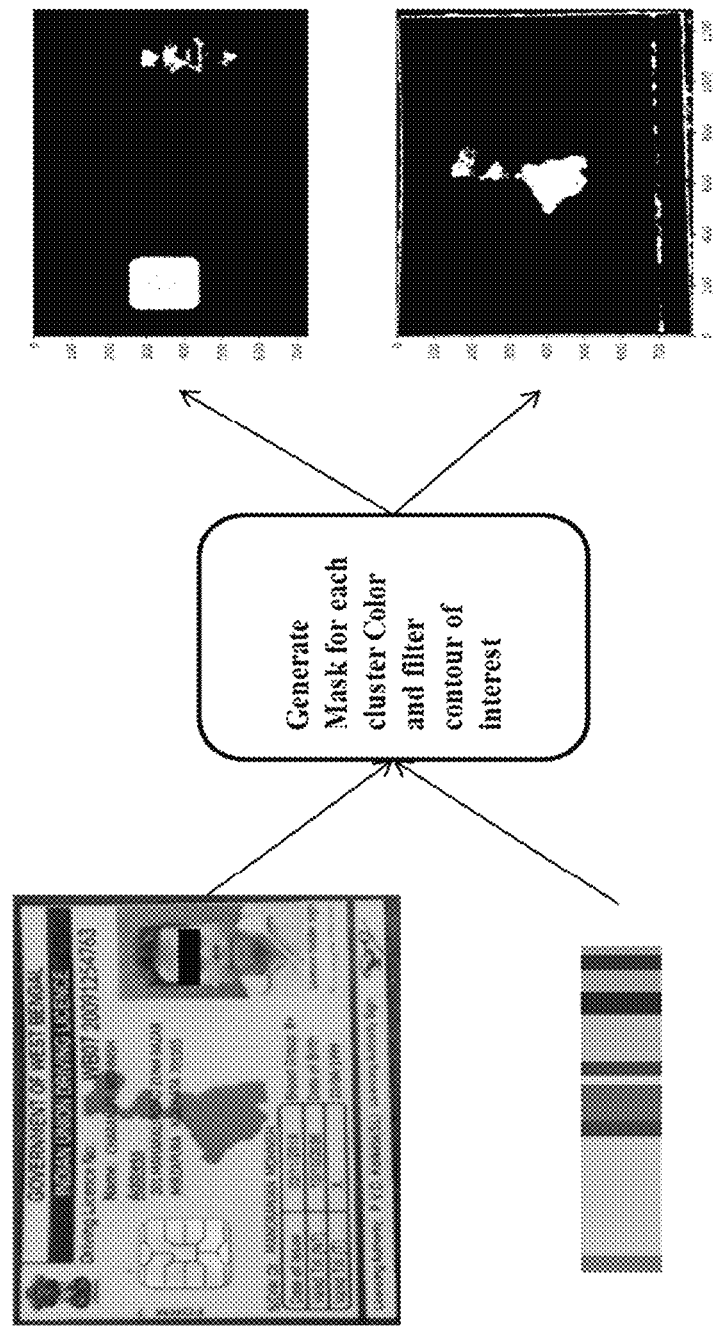
Figure 3I:
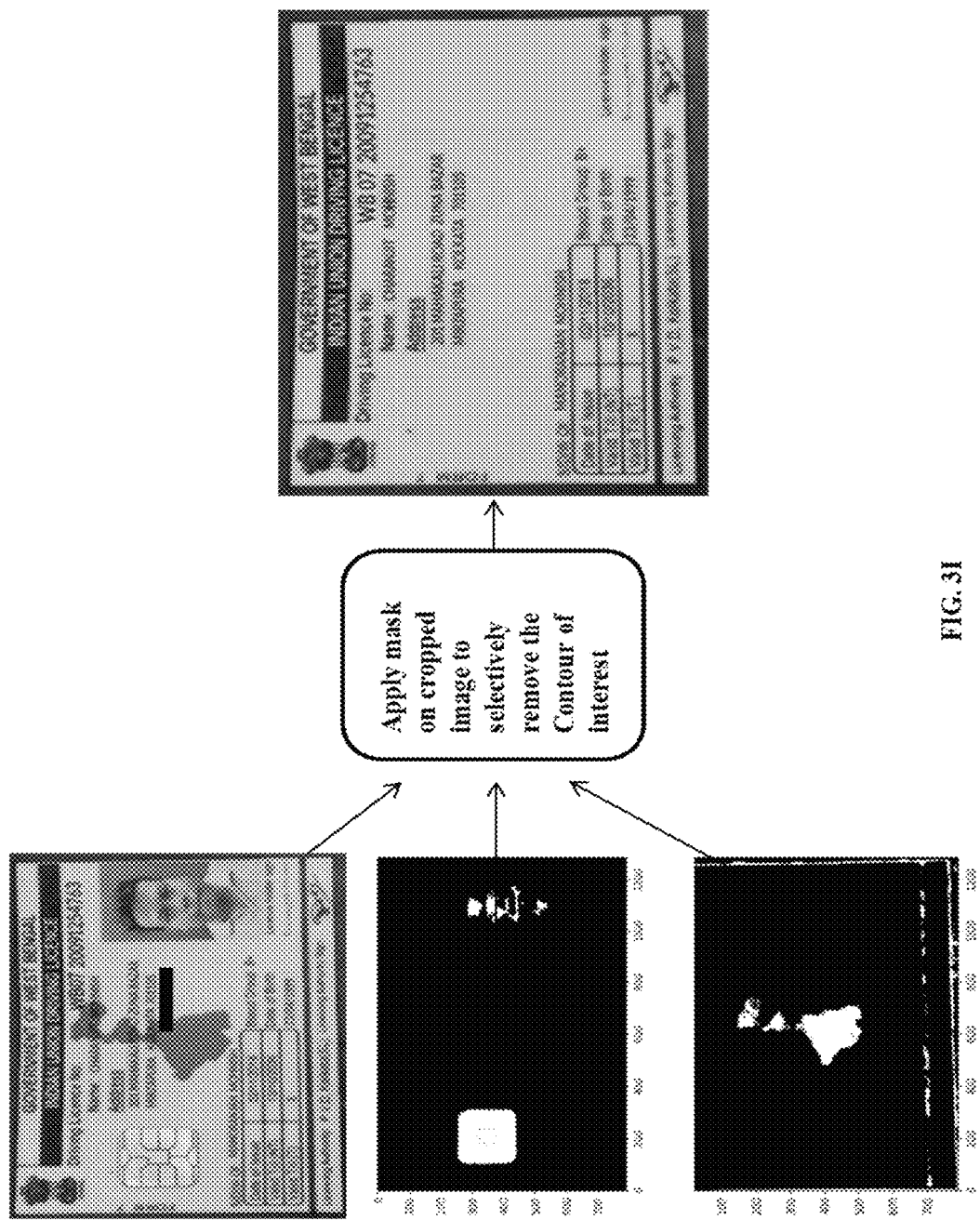

Further, once color clusters are formed pixel density or frequency information per cluster can be obtained, which is quantitative indication of density of each color pixels in the image. This information can be used to selectively eliminate the non-significant colors, as required. Further, pixel density information per color can be used to derive various interpretations, for example, the color with highest pixel density is most likely to represent background etc.

c) Obtain (208*c*) a plurality of centroids, of each of the plurality of color clusters, wherein each centroid represents a unique mean color associated with each of the plurality of clusters.

d) Since the further processing of the ROI is focused on color of the image pixels, rather than RGB color space, the method disclosed utilizes HSV color space since H (Hue) provides the true color and eliminates effect of illumination on present in RGB values. Thus, step includes converting (208*d*) the centroids from RGB color space to Hue Saturation Value (HSV) space.

e) Generate (208*e*) a plurality of color masks corresponding to the plurality of clusters, wherein each color mask is generated based on a) the unique color associated with a centroid among the plurality of centroids and b) range of HSV color space defined around the centroid (FIG. 3H). Each of the color mask is generated such that it sets the pixels of the centroid along pixels having HSV values withing the HSV range defined around the HSV of the centroid to say 1 (white) while rest of the pixels to 0 pixel intensity (black) to generate a binary image.

f) Apply (208*f*) each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique color of the centroid (FIG. 3I). For example a map in the ROI (say in color red), the embedded chip on the driving license (say golden/yellow color) and the face in the photographs (say the skin color) are set to white while rest of the color pixels are set to black to generate the binary image per color mask. From the binary images, plurality of contours associated with white regions in the binary image are identified.

g) Identify (208*g*), in each of the plurality of binary ROI images, one or more contours of interest from among the plurality of contours, wherein the one or more contours of interest are i) closed contours and ii) have size above a predefined contour size (FIG. 3I). Thus, the resultant image post masking may have open contours, closed contours, and closed but very small contours. It is observed from heuristic approaches that background noise is present in closed contours, however too small closed contours not necessarily include the background noise. Thus, a contour selection criteria is set by the method as mentioned above. If a contour is too small (below the threshold value), then it is observed that it does not form a significant background noise that can obstruct our OCR accuracy or it may be part of the useful information that needs to be preserved and not eliminated as background noise. Hence the contours below a certain size are not relevant as background and are ignored.

Such small contours are generated due to the nature of the image and its content.

h) Perform (208*h*) a subtraction of the one or more contours of interest identified for each of the plurality of binary ROI images, from the ROI in accordance to spatial positions of pixels of the one or more contours of interest identified for each of the plurality of binary ROI images. The subtraction eliminates the background noise while retaining information of interest to generate a first level pre-processed image.

i) In text extraction, thresholding is required to be applied on an image before proceeding with OCR. However, if thresholding is applied directly without first level pre-processing the resultant image carries background noise that hampers OCR output. Existing thresholding techniques used by works in literature have limitations, and resultant thresholded image using conventional thresholding on images that have noise elements such as water marks, leaves behind hazy areas or dark pixel marks, when used for text extraction, results in poor extraction quality of text extraction.

Existing thresholding techniques cause loss of text information, due to small text area compared to the background & inherent noise condition in document images. Further, local neighborhood based approach calculates different thresholding values for different parts and inherently amplifies the noise in some cases.

However, the dynamic thresholding disclosed herein, works on the histogram generated from the image after the background noises are removed (histogram generated for the first pre-processed image). The peaks present in the histogram identify the foreground and background, and it is identified experimentally that mean of the peaks (left and right peak values) is the optimal spot of the global threshold value for the image. Hence it performs much better for the text extraction objective described herein, and resultant image is more suitable for OCR.

Figure 3J:
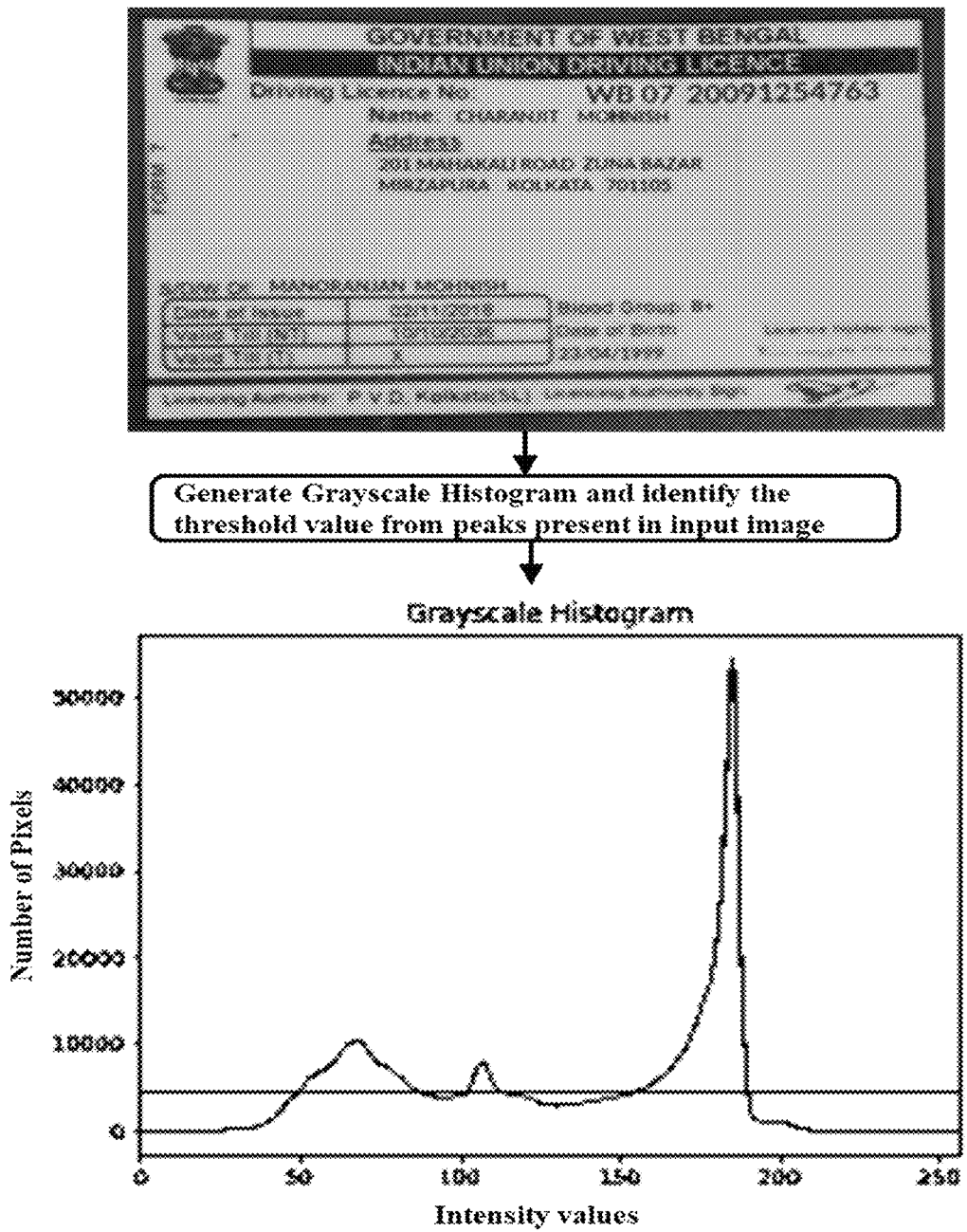
Figure 3K:
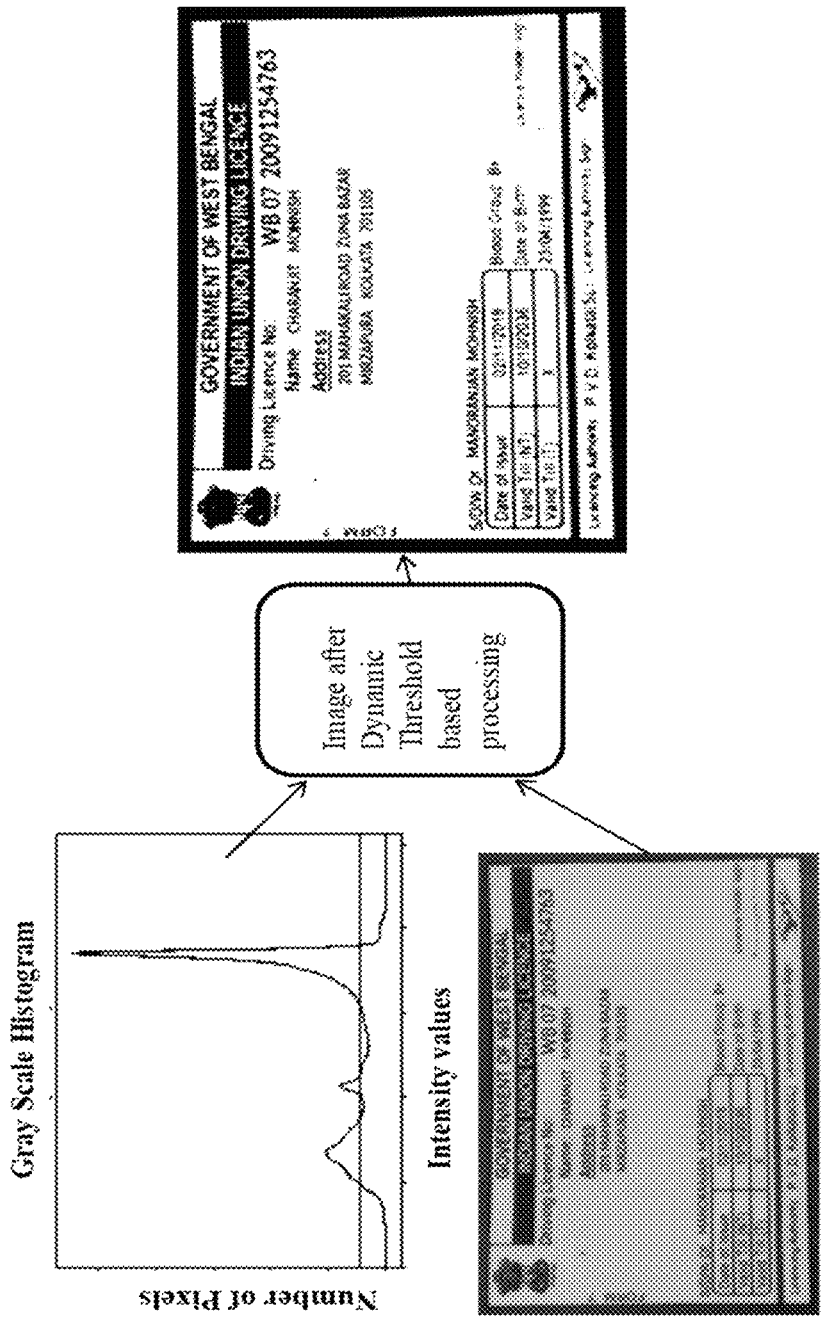

Thus, method disclosed enables applying (208i) thresholding using a dynamically derived threshold value on the first level pre-processed image to obtain a second level pre-processed image. The dynamic thresholding as depicted in FIGS. 3J and 3K and deriving the threshold value dynamically comprises step of:

1. Calculating the histogram of the first level pre-processed image.
2. Determining average pixel intensity of the first level pre-processed image and a left most and a right most peak value in the histogram.
3. Calculating the threshold value by averaging the left most and the right most peak values. As explained above, the peaks present in the histogram identify the foreground and background, and it is identified experimentally that mean of the peaks (left and right) peak values) is the optimal spot of the global threshold value for the image.

Figure 3L:
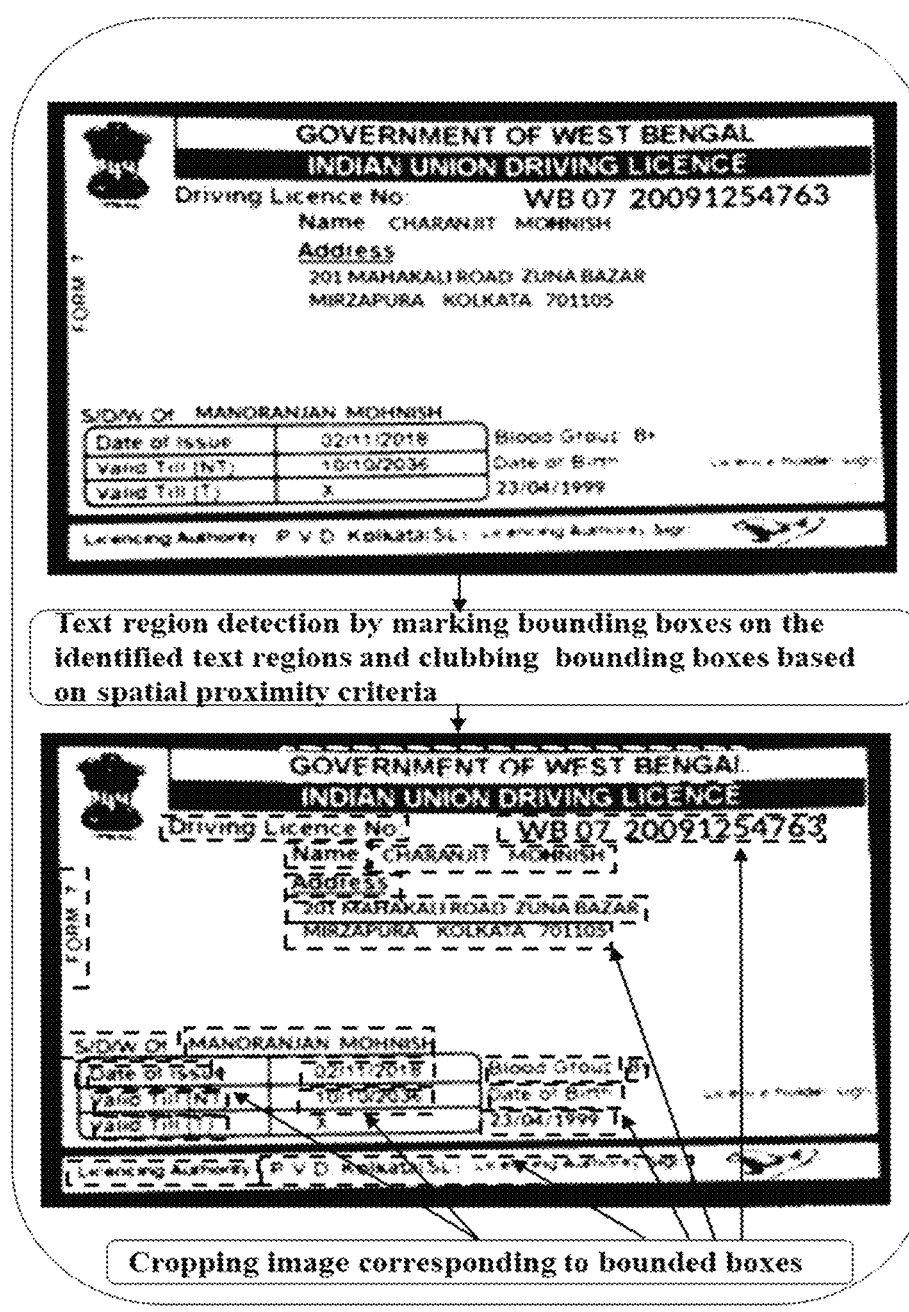

Referring back to the step 210 of the method 200, the one or more hardware processors 104 are configured to apply text detection technique on the second level pre-processed image to mark a plurality of bounding boxes around text information (text regions) in the second level pre-processed image as depicted in FIG. 3L. The plurality of bounding boxes are identified by spatial positions defined by corner coordinates and corresponding height and width. However, in first round of text region identification, spatially close words that mostly relate to single information field may still be identified by separate text bounding boxes. For example,

| INDIAN | UNION | DRIVING | LINCENSE |

Thus, one or more bounding boxes are clubbed based on a spatial proximity criteria. The spatial proximity criteria analyses proximity or overlaps among spatially relatable text bounding boxes to club one or more bounding boxes of text regions to associate relatable information into a single bounding, as below. The final bounding boxes post clubbing are depicted in FIG. the sample driving license.

| INDIAN UNION DRIVING LINCENSE |

Thus, the entire clubbed text region is considered for interpreting the text information within. For the example above, it is understood to the clubbed text region provides name of issuing authority for the driving license.

Figure 4:
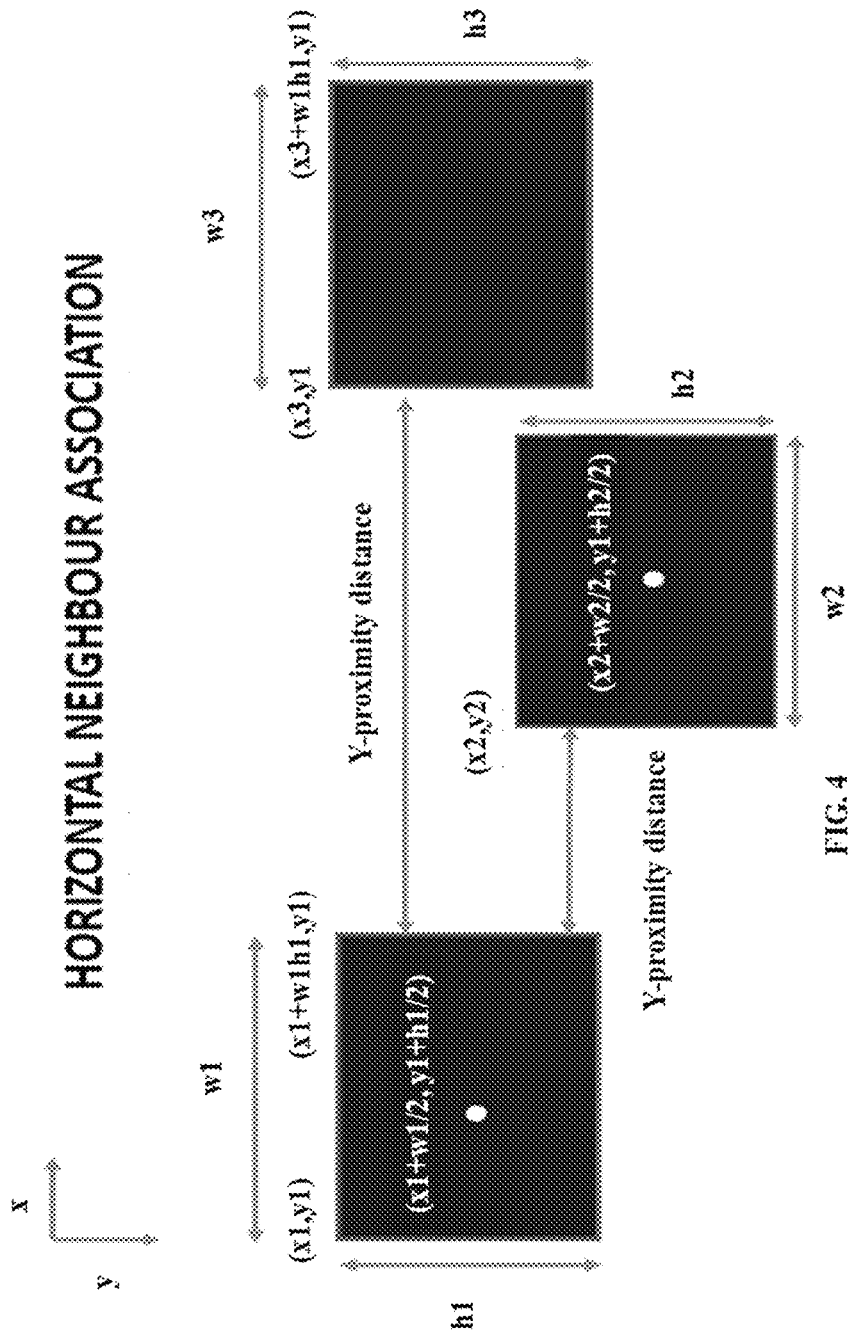
FIG. 4 illustrates an example implementation of a spatial proximity criteria that combines one or more text bounding boxes into a single text region, in accordance with some embodiments of the present disclosure.

FIG. 4 illustrates an example implementation of a spatial proximity criteria that combines one or more text bounding boxes into a single text region, in accordance with some embodiments of the present disclosure.

The spatial proximity criteria based analysis includes receiving identified text regions (bounded boxes) as input. Further, based on spatial information of identified text region, establishes contextual relationship between group of identified text regions For example—Name "John Doe" has 2 words which are horizontally aligned on identification card and "John" and "Doe" together has to be grouped together based on their spatial location and inferred together as name of person on identification card.

Pseudocode 1 for spatial proximity criteria (context based correlation) is provided below:

```
Pseudo code 1-Horizontal Neighbor finding algorithm:
Input : file_name, text_box_lists, bounding_height_limit):
Output: horizontal grouped text box list
Algorithm: Loop text_box in text_box_list
    Loop grouped_text_box in grouped text box list
        x1_min, y1_min, x1_max, h1_max = box_param in text_box
        x2_min, y2_min, x2_max, h2_max = box_param in grouped_text_box
        if (y2_min -y1_min) < bounding_height_limit
            Push minimum(x1_min, x2_min) to grouped_text_box
            Push minimum(y1_min, y2_min) to grouped_text_box
            Push maximum(x1_max, x2_max) to grouped_text_box
            Push maximum(y1_max, y2_max) to grouped_text_box
        Else
            add text_box to grouped_text_box
    End loop
End loop
```

At step 212 of the method 200, the one or more hardware processors are configured to extract text information from each of the plurality of bounding boxes by applying OCR.

Figure 3M:
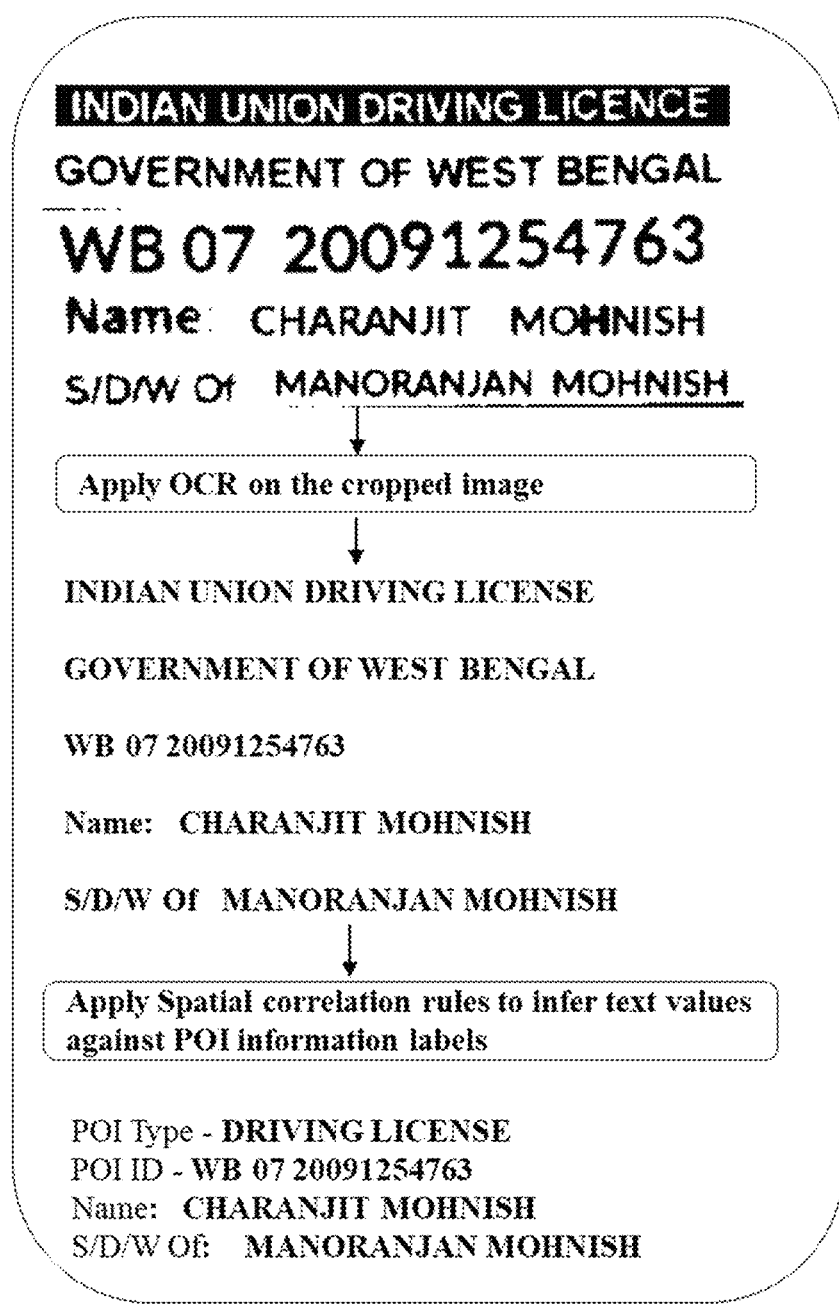

At step 214 of the method 200, the one or more hardware processors 104 are configured to determine contextual relationship among the extracted text information and refine the extracted text information based on configuration rules for the document type, As depicted in FIG. 3M The configuration rules comprise precompiled knowledge base that is referred to identify undesired text from the extracted text information, wherein the undesired text is discarded from the extracted text information, and wherein the precompiled knowledge base is composition of KEYWORDS, and VALUE_CATEGORY.

For example:
1) KEYWORDS: If we consider any Indian Driving License image, the Keyword "Indian Union Driving License" is common across all driving licenses. This keyword doesn't provide any information about the card holder, so, it should be treated as noise.

2) VALUE_CATEGORY: The possible value for the field is Text, Number, Alphanumeric, date. If we consider any Indian Driving License image, there are multiple information like card holder name, dob, gender present in the image. If the dob needs to be extracted among all the information, the VALUE_CATEGORY field value for dob will be date, which helps to consider only number and delimiter from the extracted text.
3) String similarity is leveraged here to find out the nearest possible match for desired label. Once identified, the location of matched label deduced using String processing method. Predefined spatial associations are used to fetch the desired value of interest. Further validation has been applied on the value of interest.

```
Pseudo code 2 for Extract values:
Input:
Text_box: {x-min, y-min, x-max, y-max, text_box_ocr_extracted_value,
text_box_ocr_extracted_confidence}
x-min: x-min-coordinate, y-min: y-min -coordinate, x-max: x-max -coordinate,
y-max: y-max -coordinate
Text_box_list = List of Text Box
training_data_list : list of {label_name : list of extraction rule}
Output:
extracted_items_list : List of extracted items i.e. [label_name: extracted
item ]
Algorithm:
    for text_box in text_box_list:
        Remove the text which is matching with the UNIQUE_KEYWORDS
present in the training_data
            for training_data in traning_data_list:
                text := remove junk data from text
                prepare the extracted value as per the VALUE_CATEGORY like date
        or, alphabet or, number by using regex pattern like 'dd/mm/yyyy'
            If the IS_LABEL_PRESENT value is NO
                text := Extract the value by using regex pattern
            ELSE If the IS_LABEL_PRESENT value is YES
                If the ENTITY_VALUE_ASSOCIATION_TYPE = Right
                    text := Checks the text with the label value and accept the text
value after the label
                ELSE If the ENTITY_VALUE_ASSOCIATION_TYPE = BELOW
                    text := Checks the text with the label value and consider the text
value present after the text box
                    validate text and if it is valid :
                        set extracted_item as {label_name : text }
                        push extracted_item in extracted_items_list
            End loop
    End loop
```

At step 216, the method 200 further comprises providing confidence score to enable analysis on quality of text extraction. Multiple confidence scores and an aggregate confidence scores are computed to assess quality of different extraction steps of the method. The confidence score computation includes:
a) generating confidence scores for each of the classified document type, detected text boxes, the extracted text information and a name validator
b) assigning predefined weights to each of the confidence scores
c) aggregating the weighted confidence score to compute a cumulative confidence score for the extracted text information.

Steps for confidence score calculation approach include multiple functional components for individual confidence score calculation. The components include a text detection component, a text extraction component, a string similarity component, a document classification component, and a name validator component
a) Text Detection component:—It is a deep learning based model, which detects the text boundary boxes along with the text detection confidence score for every predicted text region in an input image. The confidence score is passed to the Confidence score calculator Component.

$$C_{DETECT} = \Sum_{i=1}^{n} \cdot CW^{(i)}_{DETECT}/n \quad (1)$$

Where, $C_{DETECT}$=Confidence score obtained from the Text Detection Component for the detection. The value of COCR may be between 0 and $1.0 <= C_{DETECT} <= 1$
$CW^{(i)}_{DETECT}$=Confidence score of $i^{th}$ word contained in the image given by Text Detection Component
n=total number of words in the image
b) Text Extraction Component:—It is based on OCR engine. It gives output as the text and corresponding OCR confidence score for the given image. The confidence score is passed to the Confidence score calculator Component.

$$C_{OCR} = \Sum_{i=1}^{n} \cdot CW^{(i)}_{OCR}/n \quad (2)$$

$C_{OCR}$=Confidence score obtained from the OCR technique for the label value of given label. The value of $C_{OCR}$ may be between 0 and 1. $0 <= C_{OCR} <= 1$
$CW^{(i)}_{OCR}$=Confidence score of $i^{th}$ word contained within the value given by OCR tool
n=total number of words in the value string
c) Document Classification Component: It is CNN based deep learning model used to detect the document type, along with that the confidence score of detecting document type.
It is denoted as CClassification
d) String similarity Component: An inference Engine workflow is based on the String Similarity Component which helps to give the String similarity confidence score. It is based on Levenshtein distance, for measuring the difference between two sequences. It is denoted as $C_{SIMILARITY}$. The Levenshtein distance between two strings is given as:

$$lev(a, b) = \begin{cases} |a| & \text{if } |b| = 0, \\ |b| & \text{if } |a| = 0, \\ lev(\text{tail}(a), \text{tail}(b)) & \text{if } a[0] = b[0] \\ 1 + \min \begin{cases} lev(\text{tail}(a), b) \\ lev(a, \text{tail}(b)) \\ lev(\text{tail}(a), \text{tail}(b)) \end{cases} & \text{otherwise.} \end{cases} \quad (3)$$

e) Name Validator Component: The component is used to validate the OCR extracted text is a valid name or, not. The encoder-decoder model generates a prediction score for the next character given the previous characters. So, a character that has a high probability of occurrence, in the sequence, will have a high prediction score. It is denoted as $$C_{VALIDATOR} = \Sigma_{i=1}^{n} \cdot CW^{(i)}_{VALIDATOR}/n \quad (4)$$

$C_{VALIDATOR}$=Confidence score obtained from the Name Validator Component for the label value. The value of $C_{VALIDATOR}$ may be between 0 and 1. $0 \le C_{VALIDATOR} \le 1$ $CW^{(i)}_{VALIDATOR}$=a prediction score for the next character given the previous characters of the $i^{th}$ character n=total number of characters in the value string f) Aggregate of the prediction scores for each character is taken and the value is normalized with respect to the length of the sequence. Final confidence score is calculated by normalising the confidence score values from above mentioned components and taking the weighted sum of these values. The weight coefficients of the weighted sum formula are calibrated on the basis of which component should be given higher weightage than other components.

$$C_{AGG} = (a*C_{OCR} + b*C_{DETECTION} + c*C_{CLASSIFICATION} + d*C_{SIMILARITY} + e*C_{VALIDATOR})/(a+b+c+d+e) \quad (5)$$

Where, $C_{AGG}$=Final Aggregate Confidence score for value of label. This value will be between 0 and 1. $0 \le C_{AGG} \le 1$ a, b, c, d, e=These are coefficient weights assigned to all individual confidence scores based on what weightage needs to be given on which confidence score. Usually OCR and Detection are given high weightage.

A pseudo code for confidence score calculation is provided below:
Confidence Score Consolidator:
Find the document classification score:
  doc_classification_conf←predicted by classification model in which entity lies.
iterate each entity_name entity_name list:
  text_region_conf_score←prediction confidence score by region detector component
  calculate entity_value;
  value_word_list←break into multi words
  iterate value word in value_word_list:
    aggregate_ocr_conf_score:=ocr confidence score of each word
  end loop
  text_extraction_conf_score←aggregate_ocr_conf_score
  string_correction_based_conf_score←confidence score obtained after similarity/post-match
  normalize the values of doc_classification_conf, text_region_conf_score, text_extraction_conf_score, string_correction_based_conf_score
  cumulativate_confidence:=A*doc_classification_conf+ B*text_region_conf_score+C*text_extraction_conf_score+ D*string_correction_based_conf_score
  return cumulative_confidence;
end loop The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A method for classification of a document and text information extraction of the document, the method comprising:

receiving, via one or more hardware processors, a scanned image of the document;

detecting, via the one or more hardware processors, a Region of Interest (ROI) in the scanned image by marking a ROI bounding box on the scanned image using a text detection engine based-ROI technique, wherein the text detection engine based-ROI technique locates one or more corner coordinates of the ROI bounding box defining the ROI;

classifying, via the one or more hardware processors, the ROI into a document type among a plurality of document types using a trainable Deep Learning based multi-layered Neural Network (NN) classification model, wherein training of the trainable Deep Learning based multi-layered NN classification model comprises:

generating sample images as training data; and performing pre-processing of the training data, augmentation of the training data, and data annotation of the training data to train the trainable Deep Learning based multi-layered NN classification model, wherein the trainable Deep Learning based multi-layered NN classification model includes an architecture that is configurable based on requirements, and a complexity of the architecture of the trainable Deep Learning based multi-layered NN classification model is varied based on the training data;

applying, via the one or more hardware processors, multistage pre-processing on the classified ROI to remove a background noise, wherein the multistage pre-processing comprises:

reading the ROI into a Red Green Blue (RGB) color space and flattening the ROI;

performing unsupervised clustering by applying K-means clustering on a plurality of pixels of the ROI in the RGB color space to generate a plurality of color clusters;

obtaining a plurality of centroids from each of the plurality of color clusters, wherein each centroid of the plurality of centroids represents a unique mean color associated with each of the plurality of clusters;

converting the plurality of centroids from the RGB color space to a Hue Saturation Value (HSV) space;

generating a plurality of color masks corresponding to the plurality of clusters, wherein each color mask of the plurality of color masks is generated based on a) the unique mean color associated with a centroid among the plurality of centroids and b) a range of the HSV color space defined around the centroid, wherein each of the plurality of color masks is generated such that each color mask sets:

a plurality first specific of pixels of the plurality of pixels of the centroid having HSV values within the HSV range to a first value, and a plurality of second specific pixels of the plurality of pixels to a second value;

applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique mean color of the centroid;

identifying in each of the plurality of binary ROI images, one or more contours of interest from the plurality of contours, wherein the identified one or more contours of interest are a) closed contours and b) the identified one or more contours of interest has a size above a predefined contour size;

performing subtraction of the one or more identified contours of interest from the ROI in accordance to spatial positions of the plurality of pixels of the identified one or more contours of interest, wherein the subtraction eliminates the background noise while retaining information of interest to generate a first level pre-processed image; and applying thresholding on the first level pre-processed image to obtain a second level pre-processed image using a threshold value derived dynamically from a histogram of the first level pre-processed image, wherein the threshold value is derived dynamically by:

calculating the histogram of the first level pre-processed image;

determining average pixel intensity of the first level pre-processed image and a left most value and a right most peak value in the histogram; and calculating the threshold value by averaging the left most and the right most peak values;

applying, via the one or more hardware processors, a text detection technique on the second level pre-processed image to mark a plurality of bounding boxes around text information in the second level pre-processed image, wherein each of the plurality of bounding boxes are identified by one or more spatial positions defined by the one or more corner coordinates and a corresponding height and a corresponding width, one or more bounding boxes of the plurality of bounding boxes are clubbed based on a spatial proximity criteria, the spatial proximity criteria analyzes a proximity among the one or more bounding boxes which has spatially relatable text to club the one or more bounding boxes, and each of the one or more bounding boxes are clubbed to form relatable information into a single bounding;

extracting, via the one or more hardware processors, text information from each of the plurality of bounding boxes by applying an Optical Character Recognition (OCR); and determining, via the one or more hardware processors, contextual relationship among the extracted text information and refining the extracted text information based on configuration rules for the document type.

2. The method of claim 1, wherein the configuration rules comprise a precompiled knowledge base that is referred to identify undesired text from the extracted text information, wherein the undesired text is discarded from the extracted text information, and wherein the precompiled knowledge base is composition of KEYWORDS and VALUE_CATEGORY.

3. The method of claim 1, further comprises correcting, via the one or more hardware processors, name values from the extracted text information using an encoder-decoder model that utilizes Long short-term memory (LSTM) based Recurrent neural networks (RNN) architecture.

4. The method of claim 1, further comprises:
generating confidence scores for each of the classified document type, the detected text boxes, the extracted text information, and an output of a name validator;
assigning predefined weights to each of the generated confidence scores; and
aggregating the weighted confidence scores to compute a cumulative confidence score for the extracted text information.

5. A system for classification of a document and text information extraction of the document, the system comprising:
a memory storing instructions;
one or more Input/Output (I/O) interfaces; and
one or more hardware processors coupled to the memory via the one or more I/O interfaces, wherein the one or more hardware processors are configured by the instructions to:
receive a scanned image of the document;
detect a Region of Interest (ROI) in the scanned image by marking a ROI bounding box on the scanned image using a text detection engine based-ROI technique, wherein the text detection engine based-ROI technique locates one or more corner coordinates of the ROI bounding box defining the ROI;
classify the ROI into a document type among a plurality of document types using a trainable Deep Learning based multi-layered Neural Network (NN) classification model, wherein training of the trainable Deep Learning based multi-layered NN classification model comprises:
generating sample images as training data; and
performing pre-processing of the training data, augmentation of the training data, and data annotation of the training data to train the trainable Deep Learning based multi-layered NN classification model, wherein
the trainable Deep Learning based multi-layered NN classification model includes an architecture that is configurable based on requirements, and
a complexity of the architecture of the trainable Deep Learning based multi-layered NN classification model is varied based on the training data;

apply multistage pre-processing on the classified ROI to remove a background noise, wherein the multistage pre-processing comprises:
reading the ROI into a Red Green Blue (RGB) color space and flattening the ROI;
performing unsupervised clustering by applying K-means clustering on a plurality of pixels of the ROI in the RGB color space to generate a plurality of color clusters;
obtaining a plurality of centroids from each of the plurality of color clusters, wherein each centroid of the plurality of centroids represents a unique mean color associated with each of the plurality of clusters;
converting the plurality of centroids from the RGB color space to a Hue Saturation Value (HSV) space;
generating a plurality of color masks corresponding to the plurality of clusters, wherein each color mask of the plurality of color masks is generated based on a) the unique mean color associated with a centroid among the plurality of centroids and b) a range of the HSV color space defined around the centroid, wherein each of the plurality of color masks is generated such that each color mask sets:
a plurality first specific of pixels of the plurality of pixels of the centroid having HSV values within the HSV range to a first value, and
a plurality of second specific pixels of the plurality of pixels to a second value;
applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique mean color of the centroid;
identifying in each of the plurality of binary ROI images, one or more contours of interest from the plurality of contours, wherein the identified one or more contours of interest are a) closed contours and b) the identified one or more contours of interest has a size above a predefined contour size;
performing subtraction of the one or more identified contours of interest from the ROI in accordance to spatial positions of the plurality of pixels of the one or more identified contours of interest, wherein the subtraction eliminates the background noise while retaining information of interest to generate a first level pre-processed image; and
applying thresholding on the first level pre-processed image to obtain a second level pre-processed image using a threshold value derived dynamically from a histogram of the first level pre-processed image, wherein the threshold value is derived dynamically by:
calculating the histogram of the first level pre processed image;
determining average pixel intensity of the first level pre-processed image and a left most peak value and a right most peak value in the histogram; and
calculating the threshold value by averaging the left most peak value and the right most peak value;
apply a text detection technique on the second level pre-processed image to mark a plurality of bounding boxes around text information in the second level pre-processed image, wherein
each of the plurality of bounding boxes are identified by one or more spatial positions defined by the one or more corner coordinates and a corresponding height and a corresponding width,
one or more bounding boxes of the plurality of bounding boxes are clubbed based on a spatial proximity criteria,
the spatial proximity criteria analyzes a proximity among the one or more bounding boxes which has spatially relatable text to club the one or more bounding boxes, and
each of the one or more bounding boxes are clubbed to form relatable information into a single bounding;
extract text information from each of the plurality of bounding boxes by applying an Optical Character Recognition (OCR); and
determine contextual relationship among the extracted text information and refining the extracted text information based on configuration rules for the document type.

6. The system of claim 5, wherein the configuration rules comprise a precompiled knowledge base that is referred to identify undesired text from the extracted text information, wherein the undesired text is discarded from the extracted text information, and wherein the precompiled knowledge base is composition of KEYWORDS and VALUE_CATEGORY.

7. The system of claim 5, wherein the one or more hardware processors are further configured to correct Name values from the extracted data using an encoder-decoder model that utilizes Long short-term memory (LSTM) based Recurrent neural networks (RNN) architecture.

8. The system of claim 5, wherein the one or more hardware processors are configured to:
generate confidence scores for each of the classified document type, detected text boxes, the extracted text information, and an output of a name validator;
assign predefined weights to each of the generated confidence scores; and
aggregating the weighted confidences score to compute a cumulative confidence score for the extracted text information.

9. One or more non-transitory machine-readable information storage mediums comprising one or more instructions, which when executed by one or more hardware processors causes:
receiving a scanned image of a document;
detecting a Region of Interest (ROI) in the scanned image by marking a ROI bounding box on the scanned image using a text detection engine based-ROI technique, wherein the text detection engine based-ROI technique locates one or more corner coordinates of the ROI bounding box defining the ROI;
classifying the ROI into a document type among a plurality of document types using a trainable Deep Learning based multi-layered Neural Network (NN) classification model, wherein training of the trainable Deep Learning based multi-layered NN classification model comprises:
generating sample images as training data; and
performing pre-processing of the training data, augmentation of the training data, and data annotation of the training data to train the trainable Deep Learning based multi-layered NN classification model, wherein
the trainable Deep Learning based multi-layered NN classification model includes an architecture that is configurable based on requirements, and
a complexity of the architecture of the trainable Deep Learning based multi-layered NN classification model is varied based on the training data;
applying multistage pre-processing on the classified ROI to remove a background noise, wherein the multistage pre-processing comprises:
reading the ROI into a Red Green Blue (RGB) color space and flattening the ROI;
performing unsupervised clustering by applying K-means clustering on a plurality of pixels of the ROI in the RGB color space to generate a plurality of color clusters;
obtaining a plurality of centroids from each of the plurality of color clusters, wherein each centroid of the plurality of centroids represents a unique mean color associated with each of the plurality of clusters;
converting the plurality of centroids from the RGB color space to a Hue Saturation Value (HSV) space;
generating a plurality of color masks corresponding to the plurality of clusters, wherein each color mask of the plurality of color masks is generated based on a) the unique mean color associated with a centroid among the plurality of centroids and b) a range of the HSV color space defined around the centroid, wherein each of the plurality of color masks is generated such that each color mask sets:
a plurality first specific of pixels of the plurality of pixels of the centroid having HSV values within the HSV range to a first value, and
a plurality of second specific pixels of the plurality of pixels to a second value;
applying each of the plurality of color masks to the ROI to obtain a plurality of binary ROI images, wherein each of the plurality of binary ROI image comprises one or more contours indicating spatial locations of one or more pixels among the plurality of pixels in the ROI that belong to the unique mean color of the centroid;
identifying in each of the plurality of binary ROI images, one or more contours of interest from the plurality of contours, wherein the identified one or more contours of interest are a) closed contours and b) the identified one or more contours of interest has a size above a predefined contour size;
performing subtraction of the one or more identified contours of interest from the ROI in accordance to spatial positions of the plurality of pixels of the identified one or more contours of interest, wherein the subtraction eliminates the background noise while retaining information of interest to generate a first level pre-processed image; and
applying thresholding on the first level pre-processed image to obtain a second level pre-processed image using a threshold value derived dynamically from a histogram of the first level pre-processed image, wherein the threshold value is derived dynamically by:
calculating the histogram of the first level pre processed image;

determining average pixel intensity of the first level pre-processed image and a left most value and a right most peak value in the histogram; and calculating the threshold value by averaging the left most and the right most peak values;

applying a text detection technique on the second level pre-processed image to mark a plurality of bounding boxes around text information in the second level pre-processed image, wherein each of the plurality of bounding boxes are identified by one or more spatial positions defined by the or more corner coordinates and a corresponding height and a corresponding width, one or more bounding boxes of the plurality of bounding boxes are clubbed based on a spatial proximity criteria, the spatial proximity criteria analyzes a proximity among the one or more bounding boxes which has spatially relatable text to club the one or more bounding boxes, and each of the one or more bounding boxes are clubbed to form relatable information into a single bounding;

extracting text information from each of the plurality of bounding boxes by applying an Optical Character Recognition (OCR); and determining contextual relationship among the extracted text information and refining the extracted text information based on configuration rules for the document type.

* * * * *